United States Patent
Al-Samarae et al.

(10) Patent No.: US 7,478,873 B2
(45) Date of Patent: Jan. 20, 2009

(54) SAFETY DEVICE

(75) Inventors: Sami Al-Samarae, Berlin (DE); Koshan Mahdi, Berlin (DE)

(73) Assignee: Takata-Petri AG, Aschaffenberg (DE)

( * ) Notice: Subject to any disclaimer, the term of this patent is extended or adjusted under 35 U.S.C. 154(b) by 0 days.

(21) Appl. No.: 11/826,393

(22) Filed: Jul. 13, 2007

(65) Prior Publication Data

US 2008/0023951 A1 Jan. 31, 2008

Related U.S. Application Data

(63) Continuation of application No. PCT/DE2006/000080, filed on Jan. 16, 2006.

(60) Provisional application No. 60/644,575, filed on Jan. 19, 2005.

(30) Foreign Application Priority Data

Jan. 19, 2005 (DE) ........................ 10 2005 003 187
Jun. 10, 2005 (DE) ........................ 10 2005 027 911

(51) Int. Cl.
*B60N 2/42* (2006.01)

(52) U.S. Cl. .............................. 297/216.1; 297/284.11; 296/68.1; 280/748

(58) Field of Classification Search .............. 297/216.1, 297/284.11, DIG. 3; 296/68.1; 280/748, 280/734

See application file for complete search history.

(56) References Cited

U.S. PATENT DOCUMENTS

| 4,722,550 A | * | 2/1988 | Imaoka et al. ............... 280/727 |
| 5,197,562 A | | 3/1993 | Kakinami et al. |
| 5,477,457 A | | 12/1995 | Okada |
| 6,125,320 A | | 9/2000 | Hellmann et al. |
| 6,450,573 B1 | * | 9/2002 | Yamaguchi et al. ...... 297/216.1 |
| 6,476,730 B2 | | 11/2002 | Kakinami et al. |

(Continued)

FOREIGN PATENT DOCUMENTS

DE 39 12 359 A1 10/1990

(Continued)

OTHER PUBLICATIONS

Burnett, A Road-Based Evaluation of a Head-Up Display for Presenting Navigation Information, Proceedings of HCI International Conference, Jun. 23-27, 2003, pp. 180-184, vol. 3, Greece.

(Continued)

*Primary Examiner*—Laurie K Cranmer
(74) *Attorney, Agent, or Firm*—Foley & Lardner LLP

(57) ABSTRACT

The disclosed safety device for a motor vehicle seat may include a seat surface extending in a longitudinal direction of the seat, a securing element assigned to the seat surface; and an adjustment device operatively connected to the securing element for adjusting the securing element from a reclining position into a securing position in an event of a crash. The adjustment device is configured to reset the securing element from the securing position into the reclining position. The securing element is configured to act on the seat surface in the securing position such that the seat surface and the securing element counteract forward movement of a pelvic area of a person sitting on the seat surface in the longitudinal direction of the seat, without changing a spatial location of said seat surface.

21 Claims, 3 Drawing Sheets

}

U.S. PATENT DOCUMENTS

| | | | |
|---|---|---|---|
| 6,837,540 B2 * | 1/2005 | Yamaguchi et al. ...... | 297/216.1 |
| 6,860,508 B2 | 3/2005 | Keutz | |
| 6,908,149 B1 * | 6/2005 | Yamaguchi et al. ...... | 297/216.1 |
| 2002/0053792 A1 * | 5/2002 | Yamaguchi et al. ......... | 280/748 |
| 2002/0053793 A1 * | 5/2002 | Yamaguchi et al. ......... | 280/748 |
| 2002/0145512 A1 * | 10/2002 | Sleichter et al. .......... | 340/407.1 |
| 2003/0222490 A1 * | 12/2003 | Sakai ...................... | 297/216.1 |
| 2004/0055806 A1 | 3/2004 | Masuda et al. | |
| 2004/0209594 A1 | 10/2004 | Naboulsi | |
| 2005/0021190 A1 | 1/2005 | Worrell et al. | |
| 2007/0043505 A1 * | 2/2007 | Leicht ........................ | 701/301 |

FOREIGN PATENT DOCUMENTS

| | | | |
|---|---|---|---|
| DE | 3917613 A1 | 12/1990 | |
| DE | 196 46 104 C1 | 4/1998 | |
| DE | 197 34 307 A1 | 2/1999 | |
| DE | 198 57 900 C1 | 6/2000 | |
| DE | 199 43 595 A1 | 3/2001 | |
| DE | 101 09 680 A1 | 10/2001 | |
| DE | 200 14 731 U1 | 2/2002 | |
| DE | 101 39 412 A1 | 3/2003 | |
| DE | 203 02 628 U1 | 7/2003 | |
| DE | 102 41 267 A1 | 3/2004 | |
| DE | 203 16 865 U1 | 3/2004 | |
| DE | 103 03 010 A1 | 8/2004 | |
| DE | 103 52 733 A1 | 10/2004 | |
| DE | 103 60 176 A1 | 7/2005 | |
| DE | 603 13 537 T2 | 1/2008 | |
| EP | 1 077 154 A2 | 2/2001 | |
| EP | 1 302 372 A1 | 4/2003 | |
| EP | 1 378 391 A2 | 1/2004 | |
| EP | 1 502 835 A1 | 2/2005 | |
| FR | 2744976 A1 | 8/1997 | |
| JP | 10-181380 A | 7/1998 | |
| JP | 2000-20900 A | 1/2000 | |
| JP | 2005-135037 A | 5/2005 | |
| WO | WO 98/03365 A1 | 1/1998 | |
| WO | WO 99/52761 A1 | 10/1999 | |
| WO | WO 2004/007237 A1 | 1/2004 | |
| WO | WO 2004/106145 A1 | 12/2004 | |

OTHER PUBLICATIONS

Burnett, Usable Vehicle Navigation Systems: Are We There Yet?, Vehicle Electronic Systems 2000, Jun. 29-30, 2000, pp. 3.1.1-3.1.11.

Driver Focus-Telematics Working Group, Statement of Principles, Criteria and Verification Procedures on Driver Interactions with Advanced In-Vehicle Information and Communication Systems, Ver. 2.0, Apr. 15, 2002, 65 pages.

Gish et al., Sensory and Cognitive Factors Affecting Automotive Head-Up Display Effectiveness, Transp. Research Record 1694, Paper No. 99-0736, pp. 10-19.

Green, "How Long does It Take to Stop?" Methodological Analysis of Driver Perception-Brake Times, Transp. Human Factors, pp. 195-216, vol. 2, No. 3.

Hiramatsu, A Note for Common Understanding of Driver Assistance in Advanced Systems, Informal document No. WP.29-134-24, Nov. 16-19, 2004, agenda item 3.4, Geneva.

Lee et al., Can Collision Warning Systems Mitigate Distraction Due to In-Vehicle Devices?, pp. 1-9.

U.S. Department of Transportation, NHTSA, In-Vehicle Crash Avoidance Warning Systems: Human Factors Considerations, Summary Report DOT HS 808 531, Feb. 1997, 38 pages.

* cited by examiner

SAFETY DEVICE

BACKGROUND

This application is a continuation of International Application PCT/DE2006/000080, which has an international filing date of Jan. 16, 2006; this International Application was not published in English, but was published in German as WO 2006/076898, and which claims priority to German Applications DE 10 2005 003 187.0, filed Jan. 19, 2005 and DE 10 2005 027 911.2, filed Jun. 10, 2005, and claims priority to U.S. provisional application 60/644,575, filed Jan. 19, 2005, all of which are incorporated herein by reference in their entireties.

The invention relates to a safety device for a motor vehicle seat and to a method for actuating such a safety device.

A safety device is assigned to a motor vehicle seat and has a seat surface which extends in the longitudinal direction of the seat and is intended to be occupied by a person sitting on the seat surface and is typically formed by an upholstered seat element. The safety device also comprises a securing element which is assigned to the seat surface and an adjustment device which is operatively connected to the securing element. The adjustment device serves to adjust the securing element from a reclining position into a securing position in the event of a crash, and to reset the securing element from the securing position into the reclining position at a later time.

In the securing position, the securing element acts on the seat surface without changing its position relative to the seat, in such a way that the seat surface and the securing element together prevent a person who is wearing a seat belt of the respective vehicle seat from dipping under the seat belt, specifically its lap belt, when said person is moved forward in the direction of travel due to a crash. This effect is also referred to as "submarining."

The seat surface forms a component of the motor vehicle seat to which the safety device is assigned. However, at the same time it also forms a component of the safety device itself because, together with the securing element, it is intended to limit the forward movement of the pelvic area of a person sitting on the seat surface. For this purpose, the securing element is moved closer to the seat surface (of the upholstered seat element) by means of the adjustment device, in which case, under certain circumstances, a certain degree of deformation of the seat surface can also occur. However, in this context, the spatial position of the seat surface is not changed in its entirety (for example as a result of a pivoting of the seat surface).

A safety device is disclosed in published patent document WO 2004/007237 (incorporated by reference herein). In the event of a crash or when a pre-crash warning system is triggered, the seat surface of the motor vehicle seat is stiffened by the adjustment of the securing element in order to prevent a person located on the vehicle seat from slipping out under the seat belt. After the accident, the securing element can be reset again into its reclining position.

SUMMARY

According to an enclosed embodiment, the adjustment device is no longer restricted to adjusting the securing element between a reclining position and a securing position but rather can also be adjusted into one or more intermediate positions by means of the adjustment device, which provides a useful additional function. As a result, for example, manual adjustment of the seat hardness can be made possible.

The reclining position is understood here to be the lowest position of the securing element, that is to say the position of the securing element which is furthest away from the securing position. In the securing position, the securing element is in its uppermost position. The securing position and reclining position form the reversal points of the maximum adjustment path of the securing element. The securing element can therefore be placed by the adjustment device in a position or location relative to the seat surface which corresponds either to the securing position, the reclining position or at least one intermediate position between them.

The securing element can preferably be adjusted into a plurality of intermediate positions between the reclining position and the securing position by the adjustment device. In particular, the adjustment device can serve to perform essentially infinitely variable adjustment of the securing element between the reclining position and the securing position. The positioning possibilities of the securing element are thus increased.

In one embodiment, the seat hardness of the seat surface can be adjusted by adjusting the position of the securing element. It is possible to provide for this adjustment a controller or operator control by means of which the seat hardness can, for example, be adjusted manually. By displacing or setting a seat ramp which can be generated by means of the securing element, it is possible to compress a seat foam of the motor vehicle seat to differing degrees and thus to set different settings of the seat hardness. This arrangement provides an individually adjustable, and thus increased, sitting comfort for the vehicle occupant.

The adjustment device is preferably embodied in such a way that, by automatically adjusting the position of the securing element relative to the seat surface, said adjustment device adapts the seat hardness of the seat surface to a speed of the motor vehicle in which the motor vehicle seat with the safety device is located. This adaptation of the seat hardness can, for example, be carried out by means of sensors such as, for example, transverse acceleration sensors of the vehicle in order, with respect to the driving style, for example, to permit better securement of the driver with a "sporty" driving style.

The safety device preferably has at least one adjustment motor by means of which the adjustment device moves the securing element. By moving the securing element relative to the seat surface, in particular by compressing the seat foam, the seat surface is acted on without necessarily changing its position.

In one particularly preferred embodiment of the safety device, the adjustment device is embodied as an automatic adjustment device which communicates with sensors for detecting the driving behavior of a motor vehicle in which the safety device for a motor vehicle seat is installed. The sensors transmit a signal if they detect a hazardous situation, in particular a crash situation. In response to this signal, the adjustment device automatically adjusts the securing element into the securing position in order to prevent the person slipping under a seat belt (submarining) as a result of the generation of a seat ramp (which is inclined and rises in particular toward the front end of the seat). The securing element is not only adjusted out of the reclining position here but also if it was previously set in an intermediate position.

In one development of this embodiment, the adjustment device has at least one vibration function in which the adjustment device moves the securing element to and fro in a vibration movement between at least two different positions relative to the seat surface. This movement is done in response to a signal from the detectors and serves to warn against a hazardous situation as a haptic warning signal via the seat surface. The oscillating vibration movement permits a haptic and easily sensed warning in the pelvic area. In combination with ACC (Active Cruise Control) or a pre-crash sensor system, it is possible to utilize this option to warn the driver.

The vibration movement of the securing element preferably occurs about the currently set position of the securing element. If the securing element is set in an intermediate position, the reversal points of the vibration movement can be two further intermediate positions, one of which is closer to the reclining position and the other closer to the securing position than the intermediate position which is set. Alternatively, the vibration movement can also occur between the set intermediate position and another position as reversal points of the vibration movement, that is to say, for example, between the set intermediate position on the one hand and the securing position, the reclining position or a further intermediate position, on the other. In this context, a vibration movement between the reclining position and the securing position would also be possible, but, as a function of their distance from one another due to the extreme adjustment range, this would result in worse comfort for the person sitting on the motor vehicle seat.

In one further development of this embodiment, the adjustment device has a plurality of vibration functions in which the adjustment device moves different parts of the securing element to and fro in a vibration movement between at least two different positions relative to the seat surface as a function of the hazardous situations detected by the sensors for detecting the driving behavior of the motor vehicle. Thus, by means of the vibration movement which is executed, the driver can differentiate between different hazardous situations detected by the sensors, such as, for example that the vehicle is leaving the carriageway, that the vehicle is undershooting a safety distance on one specific side of the vehicle or exceeding the permissible maximum speed.

In this context, the adjustment device can preferably move a right hand side and a left hand side of the securing element to and fro separately in a vibration movement between at least two positions relative to the seat surface. The separate actuation of a left hand or right hand part of the securing element is particularly suitable for warning the driver that the vehicle is leaving the carriageway in the respective direction of the vehicle or that the vehicle is undershooting a safety distance in this direction.

The adjustment device preferably has at least two adjustment motors, specifically one which is assigned to a right hand side of the securing element and one which is assigned to its left hand side. The right hand side and the left hand side of the securing element can be adjusted and actuated separately by means of the adjustment motors into at least one intermediate position between the securing position and the reclining position.

According to one disclosed embodiment, the adjustment device which is provided for activating the securing element is connected to a means for actuating a motorized seat belt system of the respective motor vehicle seat. In this way it is possible to bring about automatic pretensioning of the seat belt in critical driving situations as a supplement to and in parallel with the functions of the securing element which are described above, said pretensioning providing additional securement to the respective vehicle occupant (in particular in a pre-crash phase). As a result, it is also possible to give the vehicle occupants in particular a sensation of being supported in critical driving situations, for example situations in which skidding occurs.

In one embodiment, the securing element is arranged underneath an upholstered element of the seat surface, in particular in the motor vehicle seat itself, and in the event of a crash, is moved closer to the seat surface by means of the adjustment device. In particular, the securing element can be arranged on the seat shell of the seat part. As a result, in the event of a crash, the securing element can easily be moved in the direction of the seat surface so that the seat surface and securing element form a barrier which acts essentially along the direction of extent of the securing element and counteracts the forward movement of the pelvic area of a person sitting on the motor vehicle seat, along the entire width of the motor vehicle seat.

The securing element is advantageously embodied as a ramp which is arranged in such a way that it acts on the seat surface or on its upholstery through pressure. For this purpose, the securing element preferably has an adjustment section which, when the securing element is positioned, is moved into such a position that (together with the seat surface) it limits the forward movement of the pelvic area of a person sitting on the respective seat surface.

In addition, the securing element has at least one section, for example in the form of an end section, by means of which the securing element is guided in a direction of movement and on which, if appropriate, a drive device can also engage.

The positioning movement of the securing element in the event of a crash can be configured as a translation, as a rotation or as a combination of a translation with a rotation. All three variants of a positioning movement have a fact in common that the securing element moves in the direction of the pelvic area of the person sitting on the seat surface of the motor vehicle seat.

A method for actuating a safety device assigned to a motor vehicle seat of a motor vehicle is disclosed herein. According to the method, at least one sensor for detecting the driving behavior of the motor vehicle transmits a signal to the adjustment device which in response automatically adjusts the securing element, in particular brings about a vibration movement of the securing element.

An embodiment of a disclosed safety device makes available a system which can function simultaneously as an effective comfort system, warning system and restraint system and expands the functions of the reversible active seat ramp.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1:
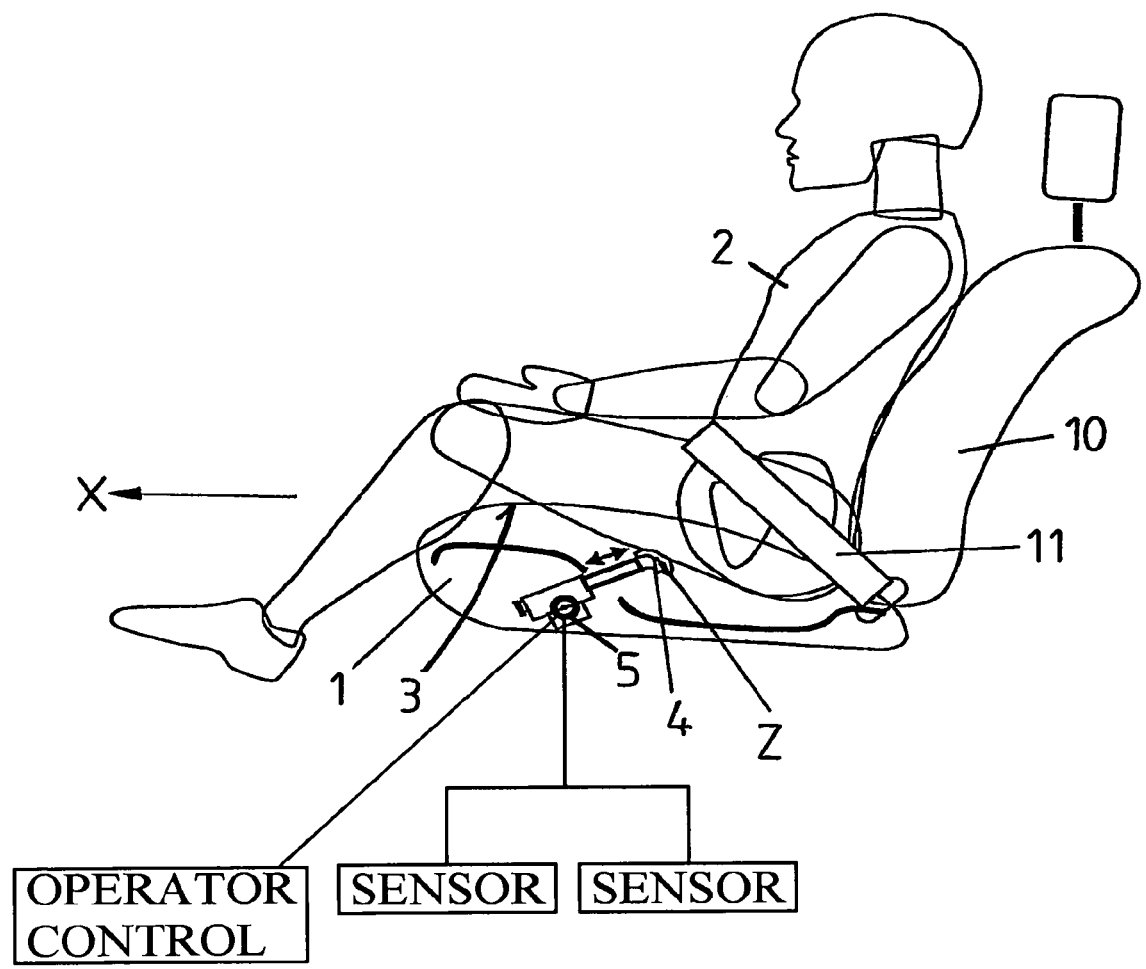
FIG. 1 shows a schematic diagram of a motor vehicle seat having a safety device with a securing element in a securing position.

FIG. 1 shows a schematic diagram of a motor vehicle seat 1 in which a safety device is integrated. The motor vehicle seat 1 has a back rest 10 as well as a seat surface 3 which extends along a longitudinal axis X of the vehicle (and at the same time in the longitudinal direction of the seat) and on which a person 2 can sit. A seat belt 11 is provided to strap in said person.

The safety device has, in addition to the seat surface 3, a securing element 4 which is arranged and integrated underneath an upholstered element of the seat surface 3 in the motor vehicle seat 1. An adjustment device 5 is connected via a transmission to the securing element 4.

The securing element 4 is embodied as a shell-like or bar-like element which runs transversely with respect to the longitudinal axis X of the vehicle (the longitudinal direction of the seat) (compare FIGS. 2, 3, 4A and 4B). The securing element is coupled from below to the upholstery of the seat surface and can be adjusted by the adjustment device 5 into different positions relative to the seat surface 3. In this context it is possible, if appropriate, for a certain degree of deformation of the seat surface 3 to occur. However, the spatial position of the seat surface 3 is not changed in its entirety (for example as a result of pivoting) but rather only its shape and hardness (due to the formation of a seat ramp). According to FIG. 1, the securing element 4 is arranged in the central region of the seat shell (relative to the longitudinal direction of the seat). According to FIG. 2, it forms the front region of the seat shell itself.

The securing element 4 is of a displaceable design and can be adjusted between a reclining position R and a securing position S (compare in FIG. 2) which form the reversal points of the displacement movement of the securing element 4. In the reclining position R, the securing element 4 is furthest away from the seat surface 3, and in the securing position S the securing element 4 is pressed in to a maximum degree into the seat upholstered element of the seat surface 3 in order to produce a seat ramp. In the securing position S, the securing element 4 acts on the seat surface 3 without changing its position relative to the seat so that the seat surface 3 and the securing element 4 together prevent (by forming a seat ramp) the person 2 strapped in by the seat belt 11 of the vehicle seat 3 from dipping through under the seat belt 11, specifically its lap belt, when said person is moved forward in the direction of travel X due to a crash.

The securing element 4 has so many intermediate positions Z between the reclining position R and the securing position S that it can essentially be adjusted in an infinitely variable fashion between the reclining position R and the securing position S.

In the exemplary embodiment illustrated in the figures, the adjustment movement of the securing element 4 occurs in a linear fashion but can also alternatively occur in a different path movement.

The position of the securing element 4 influences the seat hardness of the seat surface 3 and can be adjusted by means of the adjustment device 5. The securing element 4 can be located further away from the pelvic area and thigh owing to its displaceability, which gives rise to a higher foam thickness of the seat surface 3 and serves to provide better seat comfort. The adjustment device 5 can be operated manually (by the operator control schematically shown in FIG. 1)or be actuated by means of an activation element (not illustrated) which is connected to the adjustment device 5 in such a way that it moves the securing element 4 into the desired position.

The adjustment device 5 is embodied in such a way that in the event of a crash it automatically moves the securing element 4 closer to the seat surface 3 so that the seat surface 3 and the securing element 4 form a barrier which is effective essentially in the direction of extent of the securing element 4 transverse with respect to the direction X of travel. The barrier counteracts the forward movement of the pelvic area of a person 2 sitting on the motor vehicle seat, along the entire width of the motor vehicle seat 1.

The crash situation is detected by sensors (schematically shown in FIG. 1)or by a pre-crash system which already detects the accident before its occurrence and subsequently transmits a signal to the adjustment device 5. The adjustment device adjusts the securing element 4 from its set position into the securing position S directly before the accident, in order to ensure that the person 2 is restrained early and to avoid submarining.

Figure 2:
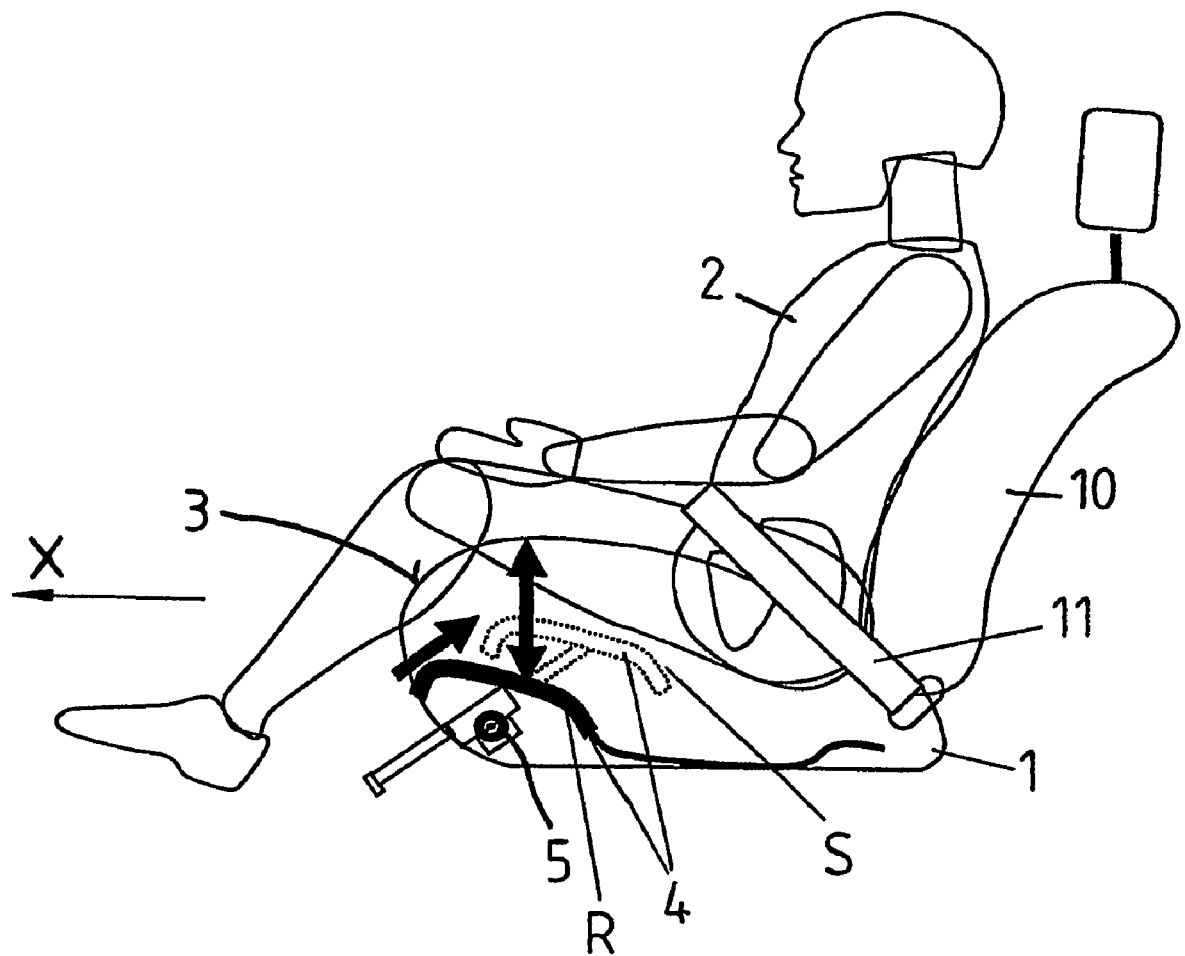
FIG. 2 shows a schematic diagram of a motor vehicle seat having a safety device with a securing element which is sometimes in the reclining position and sometimes in the securing position.
Figure 3:
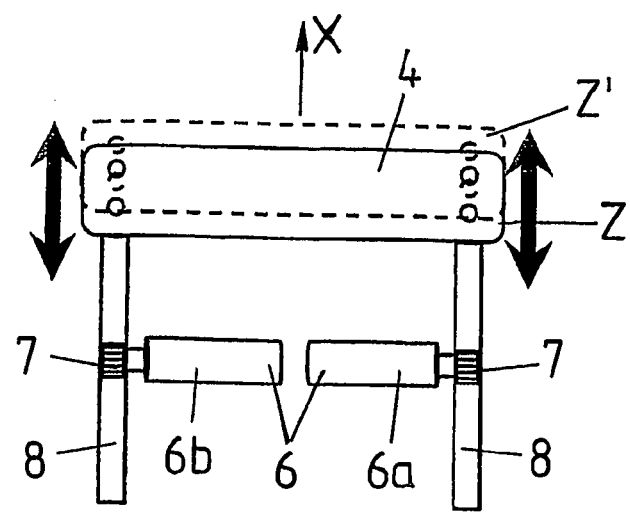
FIG. 3 shows a schematic view of a securing element of a safety device which carries out an oscillation movement or a vibration movement as a haptic warning signal.

FIG. 3 shows a schematic view of the securing element 4 in FIGS. 1 and 2, by reference to which a further function of the safety device will be described. The securing element 4 is embodied as a bar which is connected via two rods of a linkage 8 to two adjustment motors 6. In this context, the linkage 8 extends in the adjustment direction of the securing element.

The adjustment motors 6 act on the linkage 8 via gearwheels 7 in such a way that said linkage 8 is moved in the direction of its extent. The adjustment motors 6 are part of the adjustment device 5. When they are activated, the linkage 8 is moved and the position of the securing element 4 connected thereto is changed.

If sensors (schematically shown in FIG. 1) of the motor vehicle give a warning of a hazardous situation, in particular a tail end accident or of an excessively short safety distance, the adjustment motors 6 are activated automatically. They change their direction of rotation rhythmically and generate a vibration movement of the linkage 8 via the gearwheels 7. The linkage 8 transmits the vibration movement to the securing element 4 which acts on the upholstery of the seat surface 3 in such a way that a haptic warning signal in the form of a vibrating seat can be perceived by the person 2 located on the motor vehicle seat 1. The securing element 4 moves to and fro between the set intermediate position Z and an intermediate position Z' which is spaced apart from it. The vibration movement can also occur about the reclining position R and the securing position S if the securing element 4 is set in this position in the warning situation.

Figure 4A:
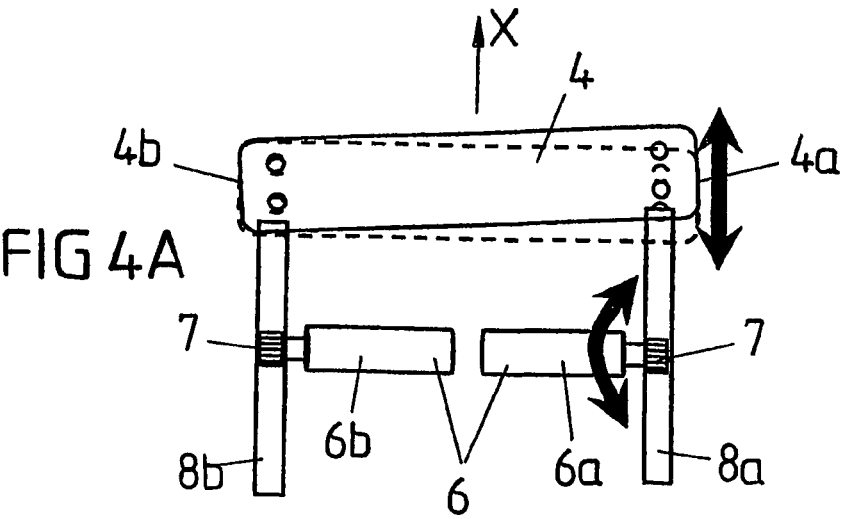
FIG. 4A shows a schematic view of the securing element of FIG. 3 which carries out a single-sided oscillation movement or vibration movement on its right hand side and as a result implements a haptic warning signal on the right hand side of the motor vehicle in order to warn against the vehicle unintentionally leaving the lane to the right.
Figure 4B:
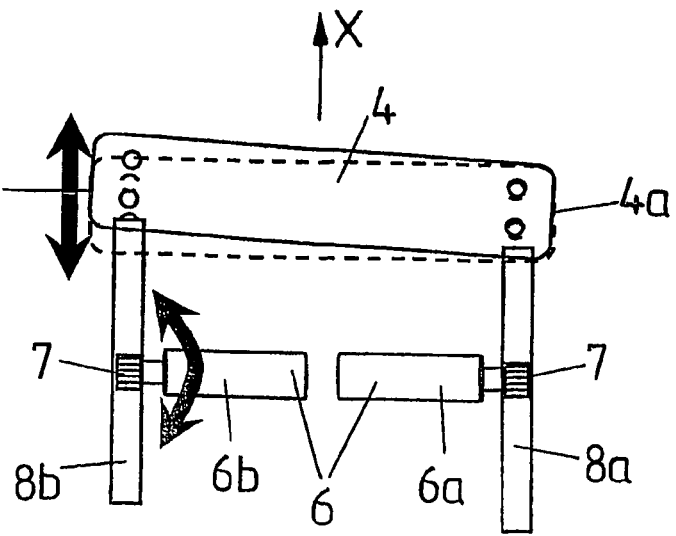
FIG. 4B shows a schematic view of the securing element in FIG. 3 which carries out a single-sided oscillation movement or vibration movement on its left hand side and as a result implements a haptic warning signal on the left hand side of the motor vehicle in order to warn against the vehicle unintentionally leaving the lane to the left.

FIGS. 4a and 4b show, as does FIG. 3, a schematic view of the securing element 4. The adjustment motors 6 are composed of a right hand adjustment motor 6a and a left hand adjustment motor 6b. These adjustment motors 6a and 6b can be actuated individually. According to FIG. 4a, only the right hand adjustment motor 6a is actuated and moves, via the right hand rod 8a of the linkage 8, the right hand side 4a of the securing element 4 which carries out a vibration movement.

Analogously to this, in the situation shown in FIG. 4b only the left hand adjustment motor 6b which causes the left hand side 4b of the securing element 4 to carry out a vibration movement is actuated.

Such a one-sided vibration movement on the left hand side or right hand side can also be sensed as a warning signal only on the respective side of the seat by the person 2 located on the motor vehicle seat 1. Such a warning signal is triggered automatically if the motor vehicle leaves or threatens to leave the prescribed lane. In the process, the side on which the motor vehicle leaves the lane correlates with the side in which the warning signal is triggered.

If the vehicle unintentionally leaves the lane to the right or to the left, the right hand side or left hand side oscillating movement of the securing element 4 can be utilized to warn or request the driver to correct the placement in the lane. This arrangement requires a special sensor system (for example video) which sends the signal to carry out the vibration movement to the adjustment device 5.

In order to improve the lateral grip when cornering, the seat hardness can also be changed on one side automatically as a function of the cornering speed and the change in the direction of travel. In this case, the described right hand side movement or left hand side movement of the securing element 4 does not occur in an oscillating fashion but is instead continuous. So that the securing element 4 can carry out a one-sided movement, the connection point to the linkage 8 is provided with play and is not embodied as a rigid connection.

Given the disclosure of the specification and drawings, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A safety device for a motor vehicle seat in a motor vehicle comprising:
    a seat surface extending in a longitudinal direction of the seat;
    a securing element assigned to the seat surface; and
    an adjustment device operatively connected to the securing element for adjusting the securing element from a reclining position into a securing position in an event of a crash,
    wherein the adjustment device is configured to reset the securing element from the securing position into the reclining position,
    wherein the securing element is configured to act on the seat surface in the securing position such that the seat surface and the securing element counteract forward movement of a pelvic area of a person sitting on the seat surface in the longitudinal direction of the seat, without changing a spatial location of said seat surface, and
    wherein the adjustment device is configured to adjust the securing element into a plurality of stationary intermediate positions located between the securing position and the reclining position.

2. The safety device as claimed in claim 1, wherein the adjustment device is configured to adjust a stationary position of the securing element relative to the seat surface.

3. The securing device as claimed in claim 1, wherein the adjustment device is configured to perform essentially infinitely variable adjustments of the securing element between the reclining position and the securing position.

4. The safety device as claimed in claim 1, wherein a seat hardness of the seat surface can be adjusted by adjusting the stationary position of the securing element.

5. The safety device as claimed in claim 4, wherein the seat hardness of the seat surface can be adjusted by adjusting the stationary position of the securing element by operator control.

6. The safety device as claimed in claim 4, wherein by automatically adjusting the stationary position of the securing element relative to the seat surface, the adjustment device adapts the seat hardness of the seat surface to a speed of the motor vehicle.

7. The safety device as claimed in claim 1, wherein at least one adjustment motor is configured to move the securing element using the adjustment device.

8. The safety device as claimed in claim 1, wherein the adjustment device is an automatic adjustment device configured to communicate with sensors for detecting a driving behavior of the motor vehicle.

9. The safety device as claimed in claim 1, wherein the adjustment device comprises at least one vibration function in which the adjustment device is configured to move the securing element to and fro in a vibration movement between at least two different positions relative to the seat surface.

10. The safety device as claimed in claim 9, wherein the adjustment device is configured to carry out the vibration movement of the seat surface when sensors for detecting a driving behavior of the motor vehicle detect a hazardous situation.

11. The safety device as claimed in claim 10, wherein the adjustment device comprises has a plurality of vibration functions in which the adjustment device is configured to move different parts of the securing element to and fro in a vibration movement between at least two different positions relative to the seat surface as a function of the hazardous situation detected by the sensors.

12. The safety device as claimed in claim 9, wherein the vibration movement of the securing element is configured to occur about a currently set position of the securing element.

13. The safety device as claimed in claim 1, wherein the adjustment device can move a right-hand side and a left-hand side of the securing element to and fro separately in a vibration movement between at least two stationary positions relative to the seat surface.

14. The safety device as claimed in claim 1, wherein the adjustment device comprises at least two adjustment motors by which a right hand side and a left hand side of the securing element can be adjusted separately to at least one stationary intermediate position located between the securing position and the reclining position.

15. The safety device as claimed in claim 1, wherein the securing element is arranged underneath the seat surface and, in the event of a crash, is configured to be moved closer to the seat surface by the adjustment device.

16. The safety device as claimed in claim 15, wherein the adjustment device is configured to adapt a seat hardness of the seat surface to a change in a direction of travel of the motor vehicle by an automatic one-sided adjustment of the stationary position of the securing element relative to the seat surface.

17. The safety device as claimed in claim 1, wherein the securing element is designed to form a ramp.

18. The safety device as claimed in claim 1, wherein the securing element is a bar or shell.

19. The safety device as claimed in claim 1, wherein the securing element is arranged in the motor vehicle seat.

20. A vehicle, comprising:
    a seat; and
    a safety device, wherein the safety device comprises:

a seat surface extending in a longitudinal direction of the seat;

a securing element assigned to the seat surface; and an adjustment device operatively connected to the securing element for adjusting the securing element from a reclining position into a securing position in an event of a crash, wherein the adjustment device is configured to reset the securing element from the securing position into the reclining position, wherein the securing element is configured to act on the seat surface in the securing position such that the seat surface and the securing element counteract forward movement of a pelvic area of a person sitting on the seat surface in the longitudinal direction of the seat, without changing a spatial location of said seat surface, and wherein the adjustment device is configured to adjust the securing element into a plurality of stationary intermediate positions located between the securing position and the reclining position.

21. A safety device for a motor vehicle seat in a motor vehicle comprising:

a seat surface extending in a longitudinal direction of the seat;

a securing element assigned to the seat surface; and an adjustment device operatively connected to the securing element for adjusting the securing element from a reclining position into a securing position in an event of a crash, wherein the adjustment device is configured to reset the securing element from the securing position into the reclining position, wherein the securing element is configured to act on the seat surface in the securing position such that the seat surface and the securing element counteract forward movement of a pelvic area of a person sitting on the seat surface in the longitudinal direction of the seat, without changing a spatial location of said seat surface, wherein the adjustment device is configured to adjust the securing element into a plurality of intermediate positions located between the securing position and the reclining position, wherein the securing element is arranged underneath the seat surface and, in the event of a crash, is configured to be moved closer to the seat surface by the adjustment device, and wherein the adjustment device is configured to adapt a seat hardness of the seat surface to a change in a direction of travel of the motor vehicle by an automatic one-sided adjustment of the position of the securing element relative to the seat surface.

* * * * *